(12) United States Patent
Sugawara (10) Patent No.: US 6,978,957 B2
(45) Date of Patent: Dec. 27, 2005

(54) SPOOL SUPPORT STRUCTURE FOR A SPINNING REEL

(75) Inventor: Ken'ichi Sugawara, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/859,965

(22) Filed: Jun. 4, 2004

(65) Prior Publication Data

US 2004/0251363 A1 Dec. 16, 2004

(30) Foreign Application Priority Data

Jun. 13, 2003 (JP) .............................. 2003-168743

(51) Int. Cl.[7] .......................................... A01K 89/015
(52) U.S. Cl. ..................................... 242/322; 242/321
(58) Field of Search ............................... 242/321, 322, 242/317

(56) References Cited

U.S. PATENT DOCUMENTS 6,089,481 A * 7/2000 Young ..................... 241/189.1
6,655,622 B2 * 12/2003 Kitajima et al. ............ 242/322
6,880,777 B2 * 4/2005 Sugawara ................... 242/322

FOREIGN PATENT DOCUMENTS

JP 2002-204640 A 7/2002

* cited by examiner

Primary Examiner—Emmanuel M Marcelo
(74) Attorney, Agent, or Firm—Shinjyu Global IP Counselors, LLP (57) ABSTRACT

A spool support structure for a spinning includes a bearing, a spool receiving portion, a retaining member, and a wobble prevention member. The bearing mounted on an inner peripheral portion of a spool is mounted on a non-circular portion of a spool shaft via a retaining member. The retaining member includes a retaining portion which is non-rotatably mounted on the non-circular portion of the spool shaft, a pushing portion that is pushed by the spool. The retaining portion is at least partially mounted to the non-circular portion such that there are two gaps in approximate bow shapes formed between the inner periphery of the retaining portion and the outer periphery of the non-circular portion. A wobble prevention member that suppresses wobble of the retaining member is mounted from the front of the retaining member in the gaps between the retaining portion and the non-circular portion.

20 Claims, 9 Drawing Sheets

Figure 9

SPOOL SUPPORT STRUCTURE FOR A SPINNING REEL

BACKGROUND OF THE INVENTION

1. Field of the Invention

The present invention relates to a spool support structure for a spinning reel. More particularly, the present invention relates to a spool support structure for a spinning reel that serves to rotatably mount a spool on a spool shaft that is movable forward and backward with respect to a reel unit.

2. Background Information

A spinning reel generally includes a reel unit that rotatively supports a handle, a rotor, and a spool that is rotatably mounted to a spool shaft. The spool of the spinning reel is movable forward and backward with respect to the reel unit, and includes a bobbin portion around the outer periphery of which fishing line is wound and in the inner periphery of which the spool shaft is mounted, and a large diameter tubular skirt portion that is arranged on the rear end of the bobbin portion. The spool shaft is non-movably mounted on a rear end portion of the bobbin portion, and an annular member that limits the rearward movement of the spool relative to the spool shaft is disposed on the rear end portion of the bobbin portion. A non-circular through hole that is generally oval shaped is formed in the inner peripheral side of the annular portion, and a front end of the spool shaft having a non-circular shape in cross-section is non-rotatively mounted in the non-circular through hole. In addition, a front drag type spinning reel also includes a drag mechanism inside the bobbin portion. The drag mechanism includes a plurality of drag plates.

This type of spool is rotatively mounted on the spool shaft via bearings, e.g., ball bearings (see for example Japanese Patent Application Publication No. 2002-204640.). These bearings are disposed on the inner periphery of the bobbin portion, and are retained therein by a tubular retaining member that is non-rotatively mounted on the outer periphery of the spool shaft and which includes a hole whose inner periphery is formed into a circular shape. A rear end portion of the retaining member is in contact with the annular member, and the retaining member is pushed rearward by the bobbin portion. In addition, a through hole that intersects with the spool shaft is formed in the retaining member, and a female threaded portion is formed in the spool shaft that connects with the through hole. The retaining member is non-rotatably coupled to the spool shaft by inserting and screwing a pin member such as an Allen screw into the through hole and the female threaded portion. Here, since the rear end portion of the retaining member contacts with the annular member, the drag mechanism can move and the drag plates can be pushed rearward while rearward movement of the spool is restricted.

There will be times when using the aforementioned conventional spinning reel that one will weaken the drag mechanism in order to enjoy interaction with a fish after the fish has been hooked. Thus, when the drag mechanism is weakened, the pushing force that pushes the drag plates rearward will be reduced. When the pushing force of the drag plates is reduced, the force that pushes the bobbin portion rearward toward the retaining member will also be reduced. Because the spool shaft having a non-circular cross-section passes through the hole formed in the retaining member, wobbling may occur due to a generally bow-shaped gap between the retaining member and the spool shaft. If the retaining member is wobbly, it may damage the ability of the spool to smoothly move forward and backward.

In view of the above, it will be apparent to those skilled in the art from this disclosure that there exists a need for an improved spool support structure that overcomes the aforementioned problems of the conventional art. This invention addresses this need in the art as well as other needs, which will become apparent to those skilled in the art from this disclosure.

SUMMARY OF THE INVENTION

It is thus an object of the present invention to prevent the retaining member in a spool support structure of a spinning reel from wobbling.

A spool support structure for a spinning reel according to the first aspect of the present invention rotatably mounts a spool on a spool shaft that is arranged to move forward and backward with respect to a reel body and includes a non-circular portion formed in a non-circular shape in cross-section on at least a front end side thereof. The spool support structure includes a bearing structure, a spool receiving portion, a retaining member, and a wobble prevention member. The bearing structure is adapted to be disposed on an inner peripheral portion of the spool and which rotatably supports the spool. The spool receiving portion is adapted to be mounted on a rear end of the non-circular portion of the spool shaft such that rearward movement of the spool receiving portion relative to the spool shaft is restricted. The retaining member is adapted to be mounted to the spool shaft between the spool and the spool receiving portion. The retaining member includes a retaining portion on an outer peripheral side of which the bearing is disposed, and a pushing portion that is adapted to be pushed rearward by the spool, at least part of the retaining portion being mounted to the non circular portion of the spool shaft such that there is a gap between an inner periphery of the retaining portion and an outer periphery of the non-circular portion. The wobble prevention member is mounted in the gap between the inner periphery of the retaining portion and the outer periphery of the non-circular portion of the spool shaft.

With this spool support structure, wobble of the retaining member can be prevented because, for example, a gap between the inner periphery of the retaining member and the outer periphery of the non-circular portion of the spool shaft can be reduced by mounting in the gap a wobble prevention member having a cross-section that matches the shape of the gap.

A spool support structure according to the second aspect of the present invention is the spool support structure of the first aspect of the present invention, in which the retaining portion includes a first retaining portion that is arranged on a front side of the pushing portion, and a second retaining portion that is arranged on a rear side of the pushing portion. The bearing structure include a first bearing that is disposed on the first retaining portion, and a second bearing that is disposed on the second retaining portion. In this configuration, the rotation of the spool with respect to the spool shaft can be made even smoother due to the arrangement of the first bearing and the second bearing.

A spool support structure according to the third aspect of the present invention is the spool support structure of the first or second aspect of the present invention, in which the retaining member is non rotatably mounted to the spool shaft with a pin member that is inserted through the retaining portion and the non-circular portion. In this configuration, the retaining member can be reliably fixed to the spool shaft with a simple structure by, for example, respectively forming a through hole and a female threaded portion in the retaining portion and the non-cylindrical portion, and inserting and screwing therein a pin member such as an Allen screw which has a male threaded portion formed in its outer periphery.

A spool support structure according to the fourth aspect of the present invention is the spool support structure of any of the first through third aspects of the present invention, in which the outer periphery of the non-circular portion is formed into an approximate oval shape; the inner periphery of the retaining portion is formed into an approximate circular shape; and the gap between the inner periphery of the retaining portion and the outer periphery of the non-circular portion of the spool shaft is formed in an approximate bow shape. The gap is formed in an approximate bow shape in cross-section. In this configuration, the gap between the non-circular portion and the circular portion is formed in an approximate bow-shape at two locations because the non-circular portion has, for example, an approximate oval shape in which both side surfaces of a circle are cut out.

A spool support structure according to the fifth aspect of the present invention is the spool support structure of the fourth aspect of the present invention, in which the wobble prevention member includes a large diameter head portion that is disposed on a front side of the retaining member, and at least one mounting portion that is formed in an approximate bow shape and mounted in the gap. In this configuration, wobble can be easily prevented by mounting the mounting portion having a shape that matches the gap between the non-circular portion and the circular portion.

A spool support structure according to the sixth aspect of the present invention is the spool support structure of the fifth aspect of the present invention, in which the head portion is a plate shaped member whose outer shape is formed in an approximate bow shape. In this configuration, two wobble prevention members having one mounting portion each can be respectively mounted in the gap.

A spool support structure according to the seventh aspect of the present invention is the spool support structure of the fifth aspect of the present invention, in which the head portion is an annular member whose outer shape is formed in an approximate circular shape, and is formed unitarily with the mounting portion. In this configuration, one wobble prevention member having for example two mounting portions can be mounted in the gaps.

A spool support structure according to the eighth aspect of the present invention is the spool support structure of any of the first through seventh aspects of the present invention, in which the non-circular portion includes an engagement groove formed on its outer periphery; and the wobble prevention member includes an engagement projection that engages with the engagement groove such that the wobble prevention member is prevented from falling off of the spool shaft. The wobble prevention member is arranged on the inner peripheral side, and includes an engagement projection that engages with the engagement groove and prevents the wobble prevention member from falling off of the spool shaft. In this configuration, the wobble prevention member can be prevented from falling off by engaging the engagement projection in the engagement groove.

A spool support structure according to the ninth aspect of the present invention is the spool support structure of the fifth aspect of the present invention, in which there are a plurality of gaps between the inner periphery of the retaining portion and the outer periphery of the non-circular portion, and the wobbling prevention member includes a plurality of mounting that are formed unitarily with the head portion and are mounted in the plurality of gaps.

A spool support structure according to the tenth aspect of the present invention is the spool support structure of any of the first through ninth aspects of the present invention, in which there are a plurality of gaps between the inner periphery of the retaining portion and the outer periphery of the non-circular portion of the spool shaft, and the wobble prevention member includes a plurality of wobble prevention components, each of the plurality of wobble prevention components including a large diameter head portion that is disposed on a front side of the retaining member, and at least one mounting portion that is mounted in the gap.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
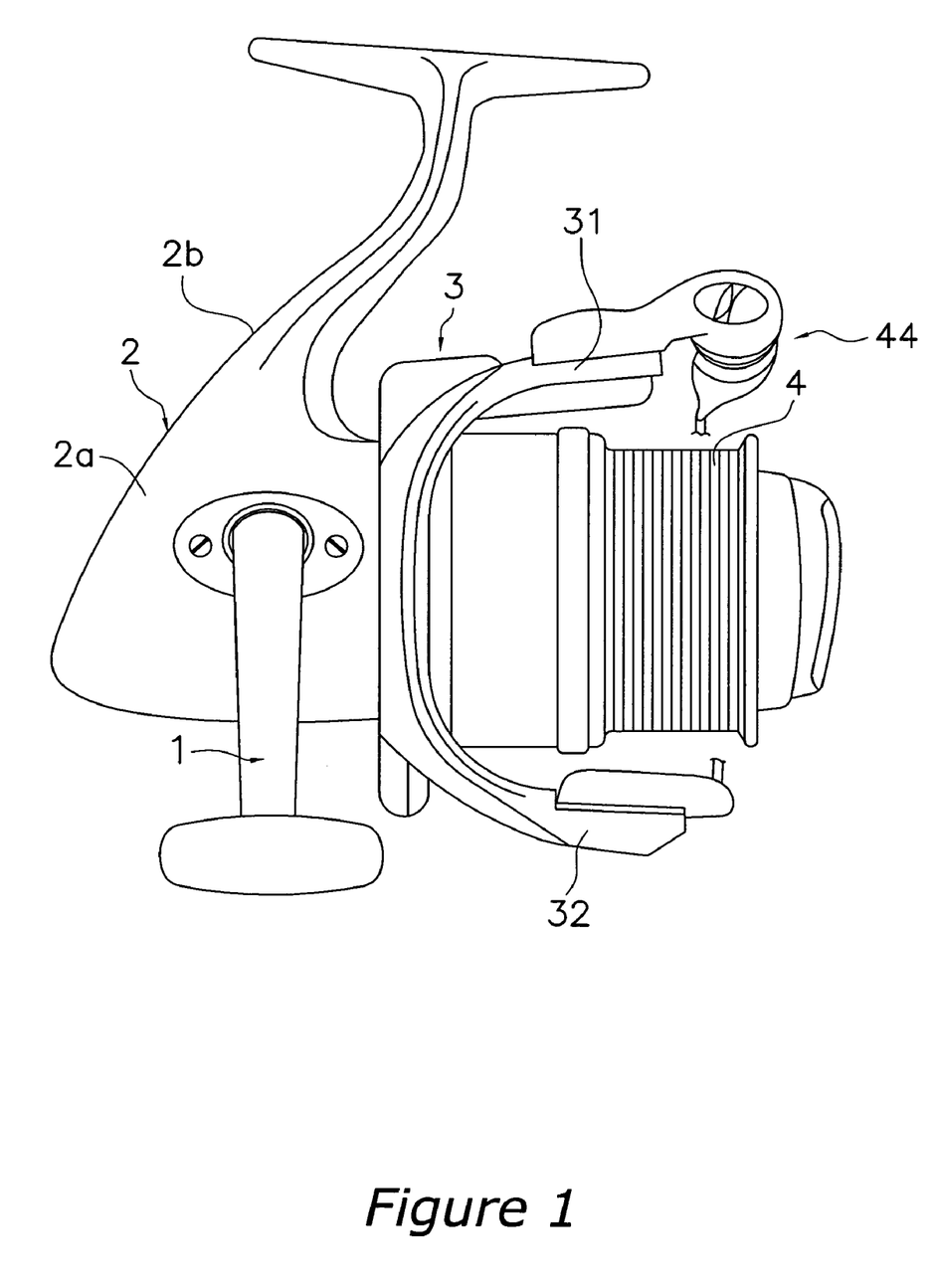
FIG. 1 is a lateral view of a spinning reel in accordance with an embodiment of the present invention.

As shown in FIG. 1, a spinning reel in accordance with an embodiment of the present invention includes a reel unit 2, a rotor 3, a spool 4, and a handle 1 that is rotatively supported by the reel unit 2. The rotor 3 is rotatively supported on the front of the reel unit 2. The spool 4 has fishing line wound around the outer peripheral surface thereof, and is disposed on the front of the rotor 3 so that it can be moved forward and backward.

Figure 2:
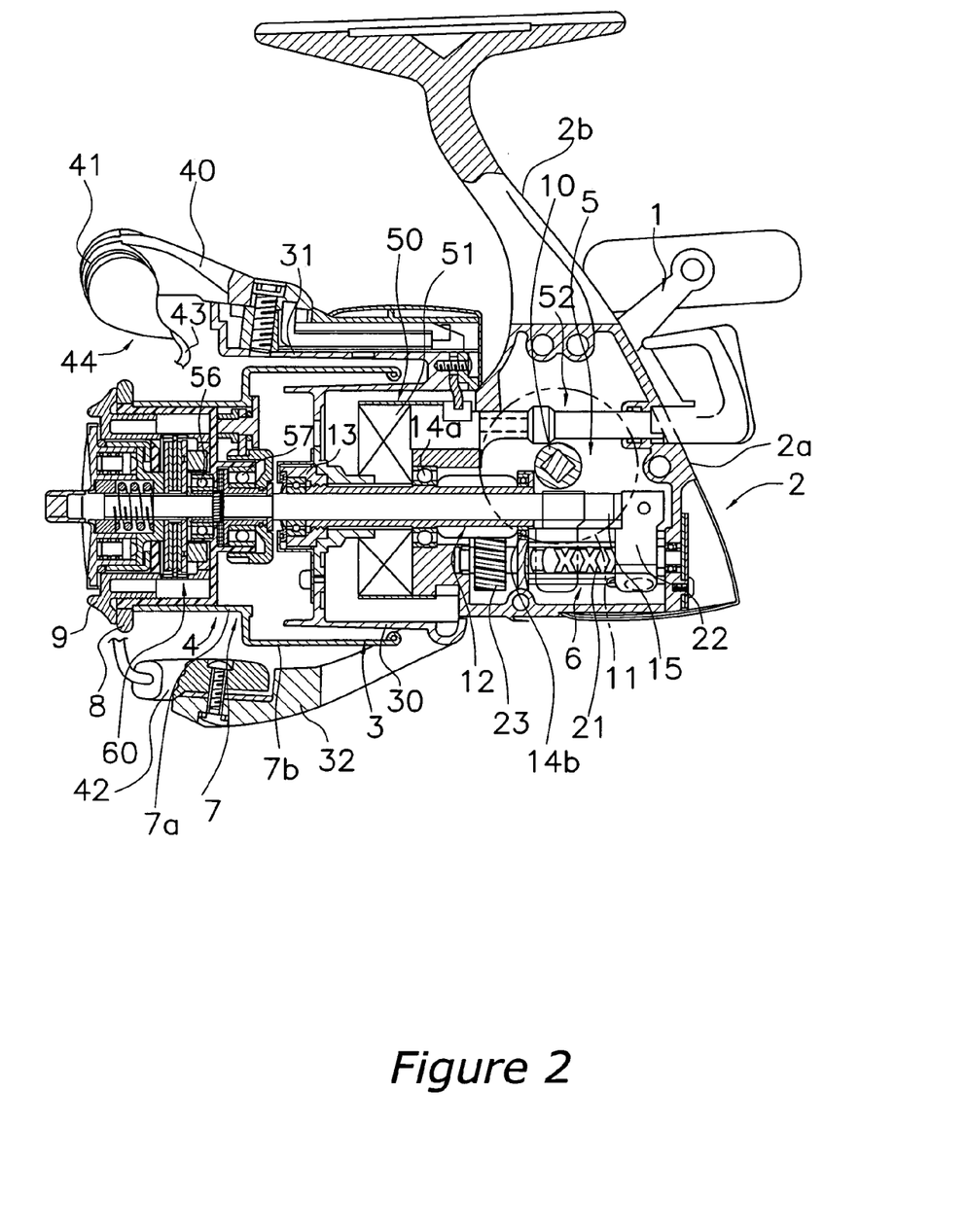
FIG. 2 is a lateral cross-sectional view of the spinning reel in accordance with the embodiment of the present invention.

The reel unit 2 includes a reel body 2a, and a rod attachment leg 2b that extends diagonally upward and forward from the reel body 2a. As shown in FIG. 2, the reel body 2a includes an interior space. Provided within the space are a rotor drive mechanism 5 that rotates the rotor 3 in cooperation with rotation of the handle 1, and an oscillating mechanism 6 that serves to move the spool 4 backward and forward to wind fishing line uniformly onto the spool 4.

The rotor drive mechanism 5 includes a face gear 11 that rotates together with a handle shaft 10 onto which the handle 1 is fixedly coupled, and a pinion gear 12 that meshes with the face gear 11. The pinion gear 12 is formed in a hollow tubular shape, and the front portion of the pinion gear 12 extends through the center portion of the rotor 3 and is fixedly coupled to the rotor 3 with a nut 13. In addition, the middle and the rear end portions of the pinion gear 12 are rotatively supported on the reel unit 2 via bearings 14a, 14b respectively.

The oscillating mechanism 6 moves the spool 4 forward and backward by moving forward and backward a spool shaft 15 that is coupled to the center of the spool 4 via a drag mechanism 60. The oscillating mechanism 6 includes a worm shaft 21 disposed below and parallel to the spool shaft 15, a slider 22 that moves back and forth along the worm shaft 21, and an intermediate gear 23 fixedly coupled to the front end of the worm shaft 21. The rear end of the spool shaft 15 is non-rotatably and fixedly coupled to the slider 22. The intermediate gear 23 meshes with the pinion gear 12.

As shown in FIG. 2, the rotor 3 includes a cylindrical portion 30, and a first rotor arm 31 and a second rotor arm 32 arranged opposite to each other on the sides of the cylindrical portion 30. The cylindrical portion 30, the first rotor arm 31 and the second rotor arm 32 are made of, for example, an aluminum alloy and unitarily formed as a one-piece member.

A first bail support member 40 is pivotably mounted to the outer peripheral side of the front end of the first rotor arm 31. A line roller 41 for guiding fishing line to the spool 4 is mounted to the front end of the first bail support member 40. In addition, a second bail support member 42 is pivotably mounted to an inner peripheral side of the front end of the second rotor arm 32.

A bail 43 that is a wire member bent approximately into a U-shape is fixedly held between the line roller 41 and the second bail support member 42. The first bail support member 40 and the second bail support member 42, the line roller 41, and the bail 43 form a bail arm 44 that guides fishing line onto the spool 4. The bail arm 44 can pivot between a line-guiding posture shown in FIG. 2 and a line-releasing posture, which is a flipped posture from the line-guiding posture.

A reverse rotation check mechanism 50 that serves to prevent/allow reverse rotation of the rotor 3 is disposed in the interior of the cylindrical portion 30 of the rotor 3. As shown in FIG. 2, the reverse rotation check mechanism 50 includes a roller-type one-way clutch 51 having a freely rotating inner ring, and a switching mechanism 52 for switching the one-way clutch 51 between an operating state (in which reverse rotation is not possible) and a non-operating state (in which reverse rotation is possible). Since reverse rotation check mechanisms are well known in the art, the reverse rotation check mechanism 50 will not be described or illustrated in further detail herein.

Figure 3:
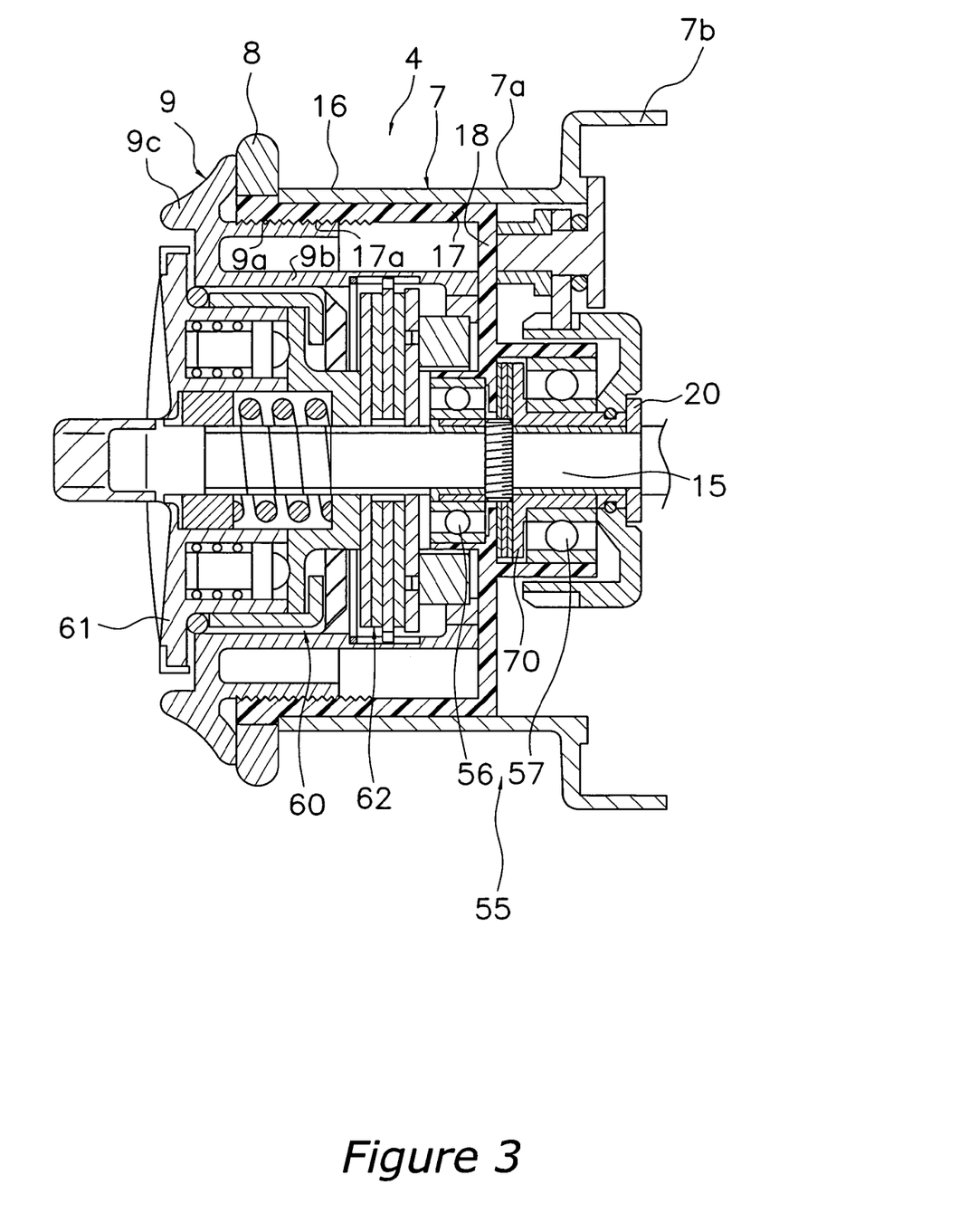
FIG. 3 is an enlarged cross-sectional view of a spool of the spinning reel in accordance with the embodiment of the present invention.

As shown in FIG. 2, the spool 4 is disposed between the first rotor arm 31 and second rotor arm 32 of the rotor 3, and is mounted to the front end of the spool shaft 15 with the drag mechanism 60 interposed therebetween. As shown in FIG. 3, the spool 4 includes a cylindrical spool unit 7 with two large/small levels and around the outer periphery of which fishing line is wound, a large diameter flange portion 8 that is mounted on the front end of the spool unit 7, and a flange fixing member 9 that serves to fix the flange portion 8 to the spool unit 7.

As shown in FIG. 3, the spool unit 7 is, for example, a cylindrical member that has two large/small levels, and is obtained by press working (such as drawing) an aluminum alloy. The spool unit 7 is rotatively mounted on the spool shaft 15 via a first bearing 56 and a second bearing 57. The spool unit 7 includes a cylindrical bobbin portion 7a around the outer periphery of which fishing line is wound, and a large diameter tubular skirt portion 7b that is unitarily formed with the rear portion of the bobbin portion 7a.

As shown in FIG. 3, the bobbin portion 7a includes a tubular portion 16 that is formed from sheet metal into a tube shape, a synthetic resin cylindrical portion 17 that is a separate member and attached to the inner peripheral side of the tubular portion 16, and an annular inner peripheral portion 18 that is unitarily formed with the cylindrical portion 17 on the rear end of the cylindrical portion 17. As shown in FIG. 3, a female threaded portion 17a that serves to mount the flange fixing member 9 is formed in the inner peripheral surface of the tubular portion 17. A bearing 55 that is composed of a first bearing 56 and a second bearing 57 are mounted on the inner peripheral side of the inner peripheral portion 18, and the bearing 55 is rotatively mounted on the spool shaft 15 via a tubular retaining member 70. A spool receiving portion 20 is in contact with the rear end of the retaining member 70, and is mounted to restrict the rearward movement of the retaining member 70.

Figure 4:
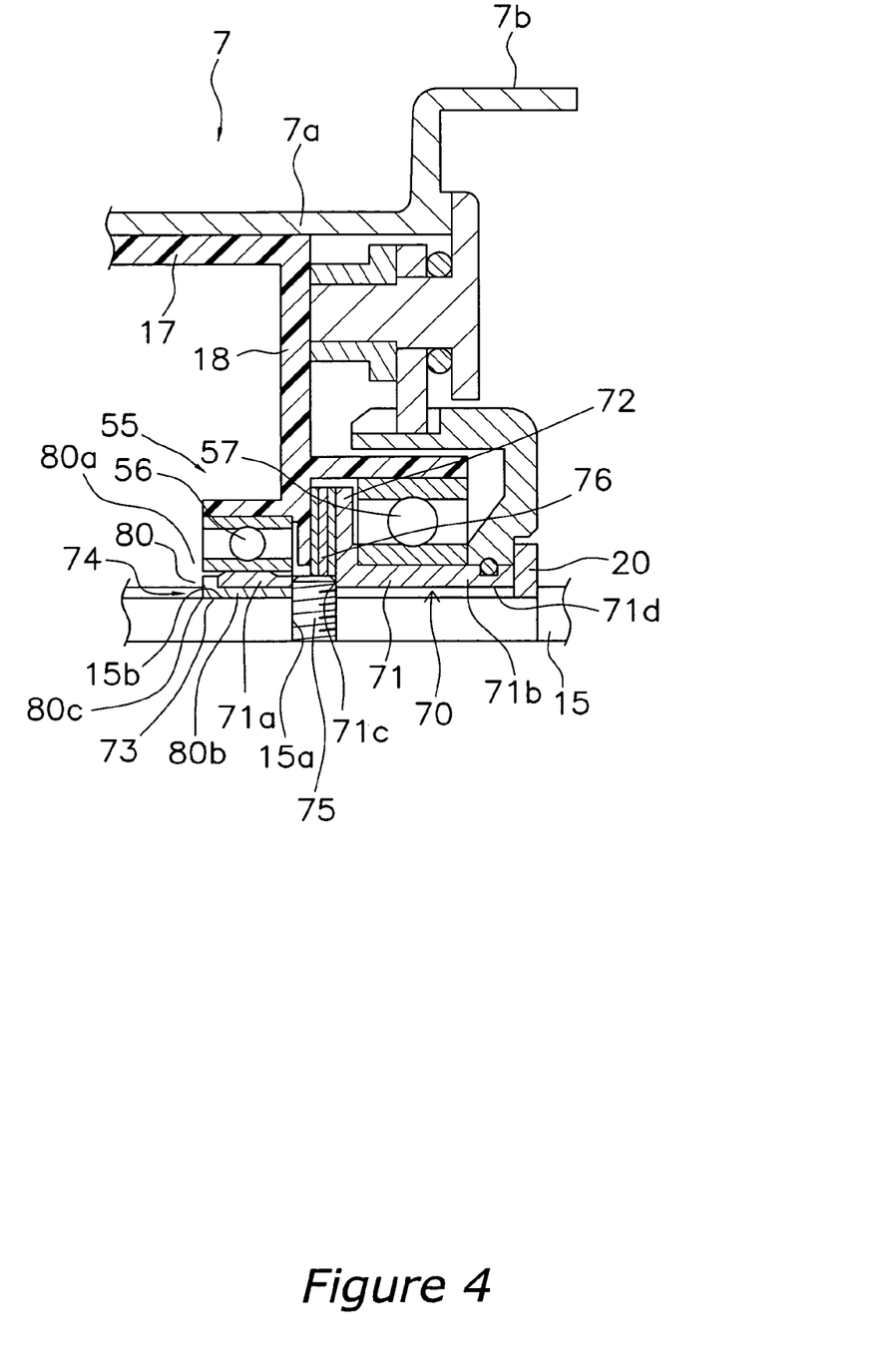
FIG. 4 is an enlarged lateral side view of a support portion of the spool in accordance with the embodiment of the present invention.

As shown in FIG. 4, the spool receiving portion 20 is a metal ring member that is mounted on the spool shaft 15 and is not movable forward and backward on the spool shaft 15. The spool receiving portion 20 is in contact with the rear end of the second bearing 57 via a member of a sound producing mechanism therebetween. By fixedly coupling the spool receiving portion 20 to the spool shaft 15, the entire spool 4 can be accommodated on the spool shaft 15 even if the inner peripheral portion 18 is pushed rearward by the drag mechanism 60.

Figure 5:
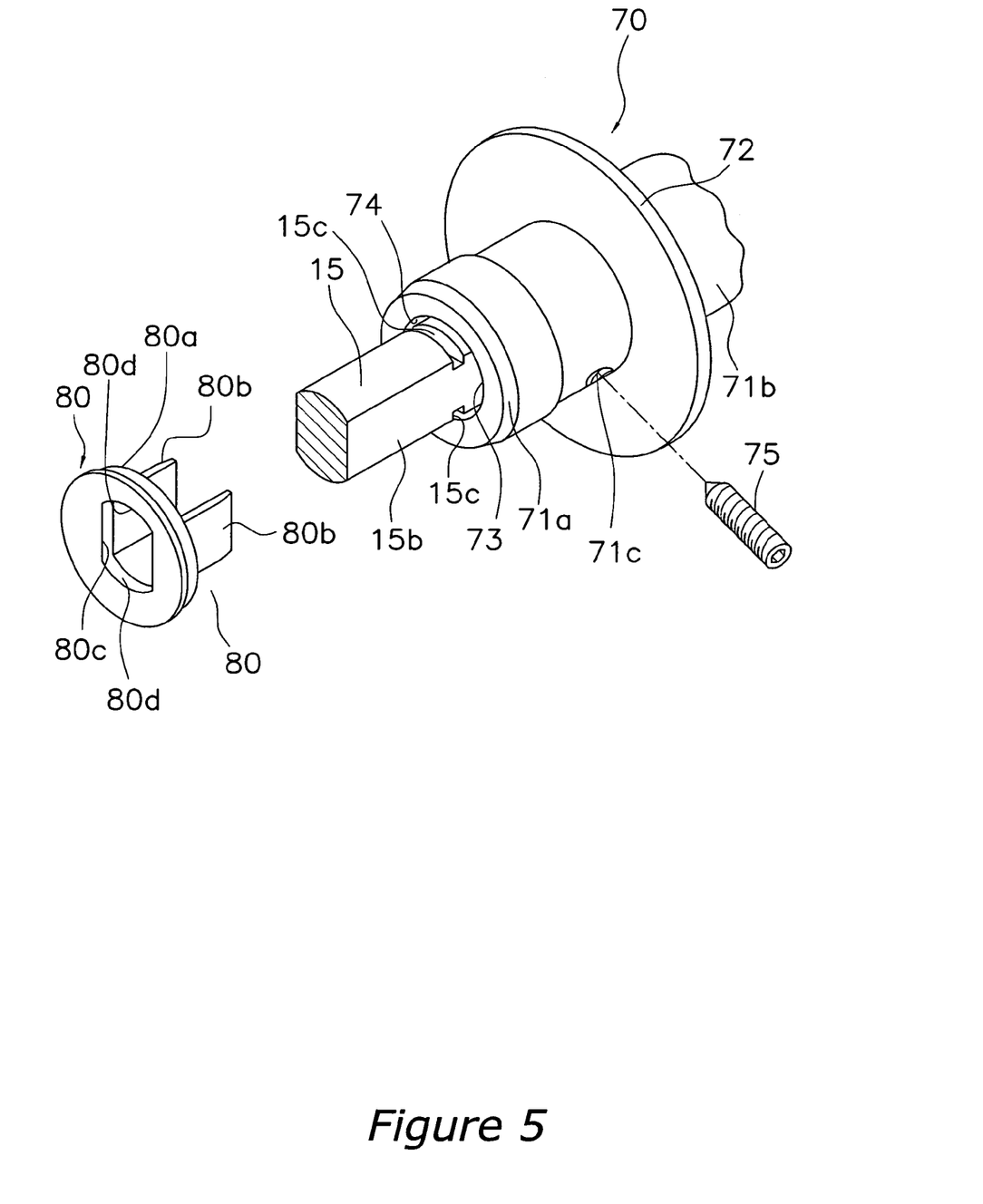
FIG. 5 is a partial perspective view of the support portion of the spool in accordance with the embodiment of the present invention.
Figure 6:
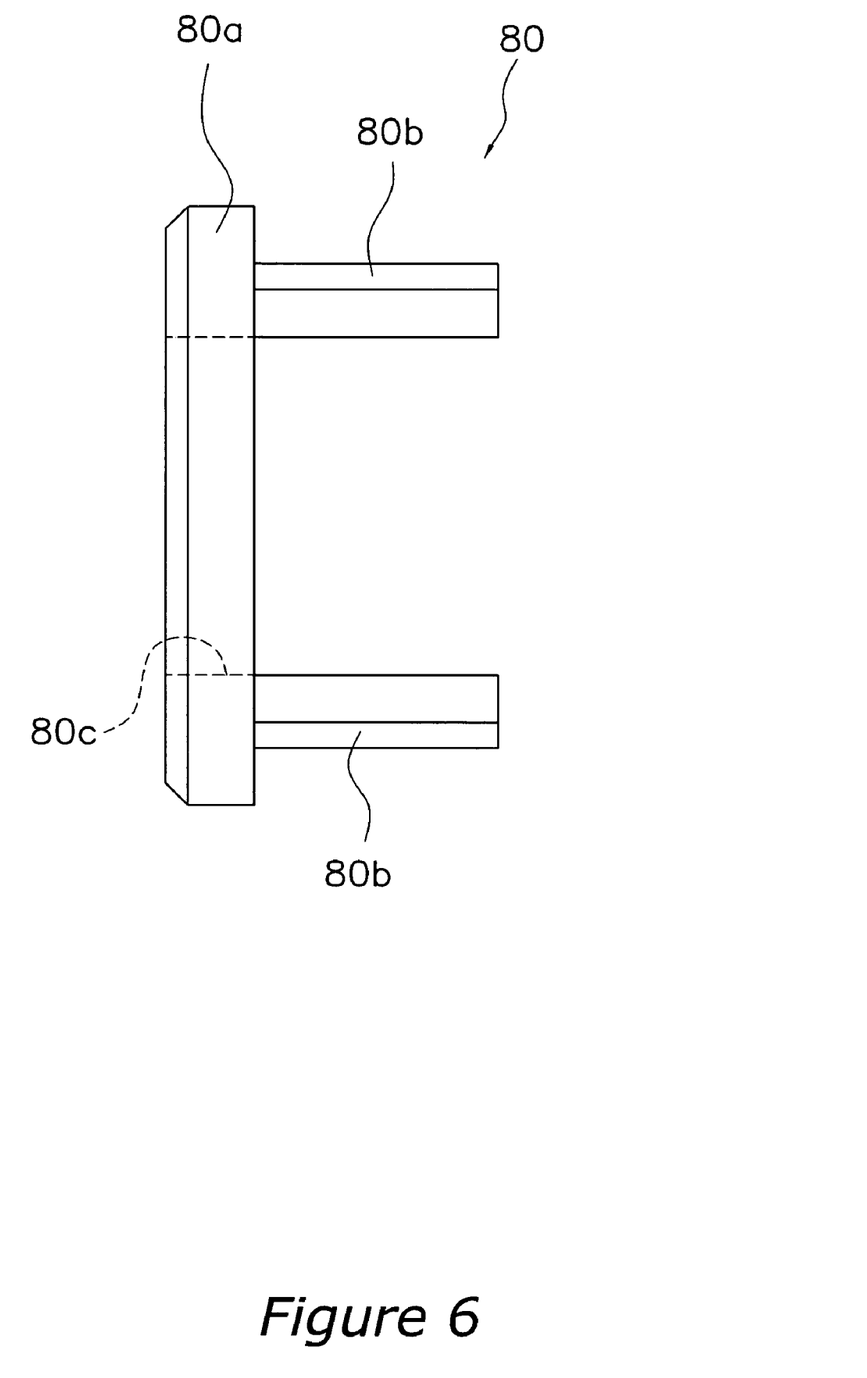
FIG. 6 is a lateral side view of a wobble prevention member in accordance with the embodiment of the present invention.
Figure 7:
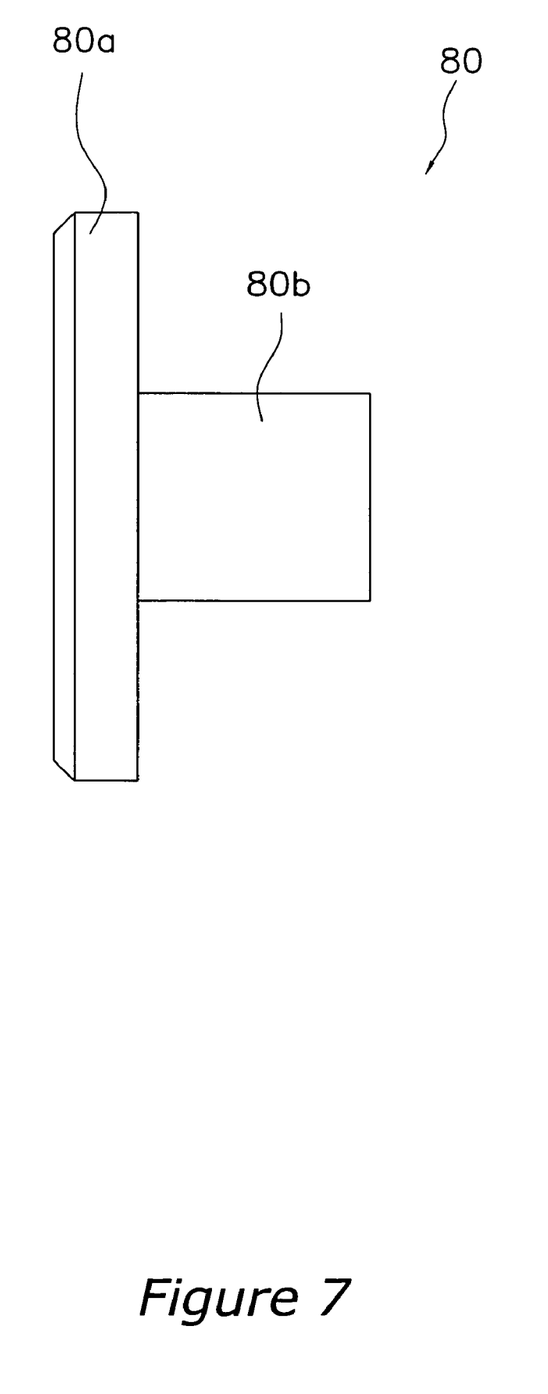
FIG. 7 is a plan view of the wobble prevention mechanism in accordance with the embodiment of the present invention.
Figure 8:
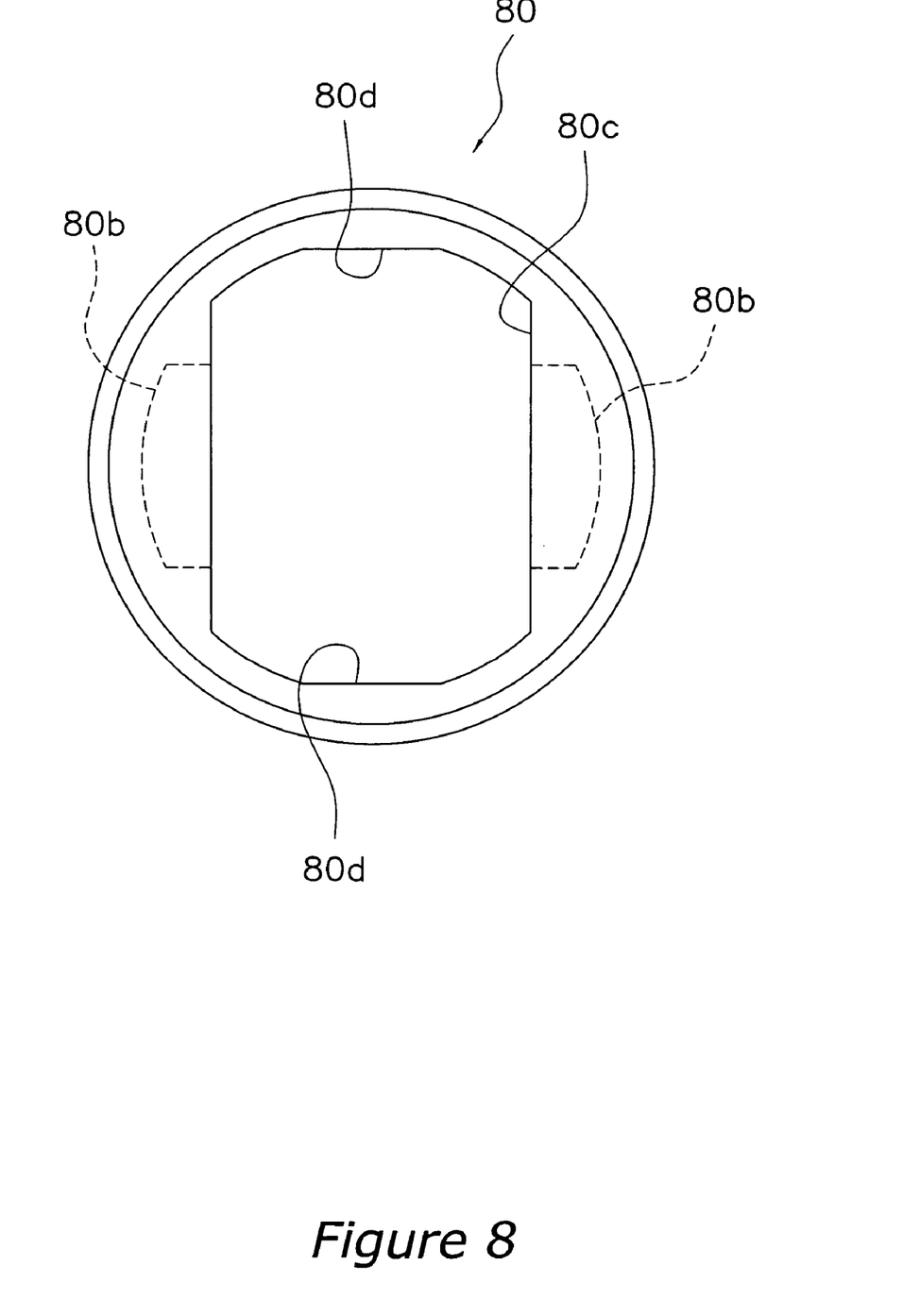
FIG. 8 is a front view of the wobble prevention mechanism in accordance with the embodiment of the present invention.

As shown in FIGS. 4 and 5, the rear end portion of the retaining member 70 is in contact with the spool receiving portion 20. The retaining member 70 is a tubular member that is pushed rearward by the inner peripheral portion 18. The retaining member 70 has the bearing 55 retained on the outer periphery thereof, and the inner periphery thereof is non-rotatively mounted on a non-circular portion 15b that is formed in a non-circular shape in cross-section on the front end portion of the spool shaft 15. The non-circular portion 15b of the spool shaft 15 is formed into an approximate oval shape in which both side surfaces of a circle are cut out. The retaining member 70 includes a retaining portion 71 whose inner periphery is non-rotatably mounted on the non-circular portion 15b of the spool shaft 15, a pushing portion 72 that is arranged on the outer periphery of the retaining portion 71 and whose front side surface is pushed by the inner peripheral portion 18, and a circular portion 73 whose inner peripheral cross-section is circular in shape and which is mounted on the non-circular portion 15b such that there are two gaps 74 formed therebetween whose cross-sections are formed in approximate bow shapes. The retaining portion 71 includes a first retaining portion 71a and a second retaining portion 71b. The first retaining portion 71a is arranged on the front side of the pushing portion 72, and the first bearing 56 is disposed on the outer periphery of the first retaining portion 71a. The second retaining portion 71b is arranged on the rear side of the pushing portion 72 and the second bearing 57 is disposed on the outer periphery of the second retaining portion 71b.

The retaining member 70 has a through hole 71c that passes therethrough and formed in the first retaining portion 71a. The retaining member 70 is non-rotatably and fixedly coupled to the non-circular portion 15b of the spool shaft 15 with a pin member 75 (that is an example of a fixing means such as an Allen screw) that screws into the female threaded portion 15a formed in the spool shaft 15. In addition, three spacer members 76 are mounted to the first retaining portion 71a in which the pin member 75 is mounted, in between the front side surface of the pushing member 72 and the inner peripheral portion 18. Furthermore, a wobble prevention member 80 that suppresses wobbling of the retaining member 70 is mounted from the front of the retaining member 70 in the gaps 74 between the circular portion 73 of the retaining member 70 and the non-circular portion 15b of the spool shaft 15.

As shown in FIGS. 5 to 8, the wobbling prevention member 80 includes a large diameter head portion 80a that is disposed on the front side of the retaining member 70, and two mounting portions 80b that are mounted in the gaps 74. The head portion 80a is an annular member whose outer periphery is formed in a generally circular shape in cross-section, and includes a recessed portion 80c that is oval in cross-section. The two mounting portions 80b are unitarily formed with the head portion 80a as a one-piece unit, such that the two mounting portions 80b face each other, and that the cross-sections of the mounting portions 80b are formed in an approximate bow shape such that they each match the gaps 74. In addition, two engagement projections 80d that are formed on the inner peripheral sides of the recessed portion 80c opposite each other and project outward. The engagement projections 80d are respectively engaged in engagement grooves 15c formed in a portion of the outer periphery of the non-circular portion 15b of the spool shaft 15, which prevents the wobble prevention member 80 from falling off.

As shown in FIGS. 2 and 3, the skirt portion 7b is unitarily formed with the bobbin portion 7a in a tubular shape so that the skirt portion 7b covers the cylindrical portion 30 of the rotor 3. The skirt portion 7b is formed from sheet metal that is obtained by drawing an aluminum alloy.

As shown in FIG. 3, the flange portion 8 is a circular plate member made of metal or manufactured from a hard, scratch-resistant ceramic. The flange portion 8 is interposed and fixedly held between the bobbin portion 7a and the flange fixing member 9 that screws into the female threaded portion 17a of the bobbin portion 7a.

As shown in FIG. 3, the flange fixing member 9 includes a tubular male threaded portion 9a, a tubular drag accommodation portion 9b, and a contact portion 9c. The male threaded portion 9a screws into the female threaded portion 17a of the bobbin portion 7a. The drag accommodation portion 9b is unitarily formed with the inner circumferential side of the male threaded portion 9a, and includes a space in the interior thereof that can accommodate a plurality of drag plates 62 (described below) of the drag mechanism 60. The contact portion 9c is provided on the front end of the male threaded portion 9a and can come into contact with the flange portion 8.

The drag mechanism 60 is mounted between the spool 4 and the spool shaft 15, and serves to apply drag force to the spool 4. The drag mechanism 60 includes a knob 61 for manually adjusting the drag force, and a plurality of drag plates 62 that are pushed toward the spool 4 by the knob 61.

Operation of the Reel

Next, the operation and movement of the reel will be described.

When casting, the bail arm 44 is flipped over to the line-releasing posture. Thus, the first bail support member 40 and the second bail support member 42 pivot. In this state, the fisherman casts the fishing rod while grasping the fishing line with the index finger of the hand with which the fishing rod is held. Thus, the fishing line is released with high momentum due to the weight of the tackle. After the tackle lands in the water, when the handle 1 is rotated in the line-winding direction, the rotor 3 rotates in the line-winding direction due to the rotor drive mechanism 5, the bail arm 44 returns to the line-winding position due to a bail flipping mechanism not shown in the figures, and the fishing line will be prevented from being released further because the reverse rotation of the rotor 3 is prevented.

When the fishing line is to be wound in, the handle 1 is rotated in the line-winding direction. When this occurs, the rotation is then transmitted via the face gear 11 and the pinion gear 12 to the rotor 3, and rotates the rotor 3. When the rotor 3 rotates, the fishing line guided by the line roller 41 is wound around the spool 4.

With this type of spool, the gaps 74 between the circular portion 73 of the retaining member 70 and the non-circular portion 15b of the spool shaft 15 can be reduced by mounting in the gaps 74 the wobble prevention member 80 having the mounting portions 80b whose cross-sections match the shapes of the gaps 74.

OTHER EMBODIMENTS

Figure 9:
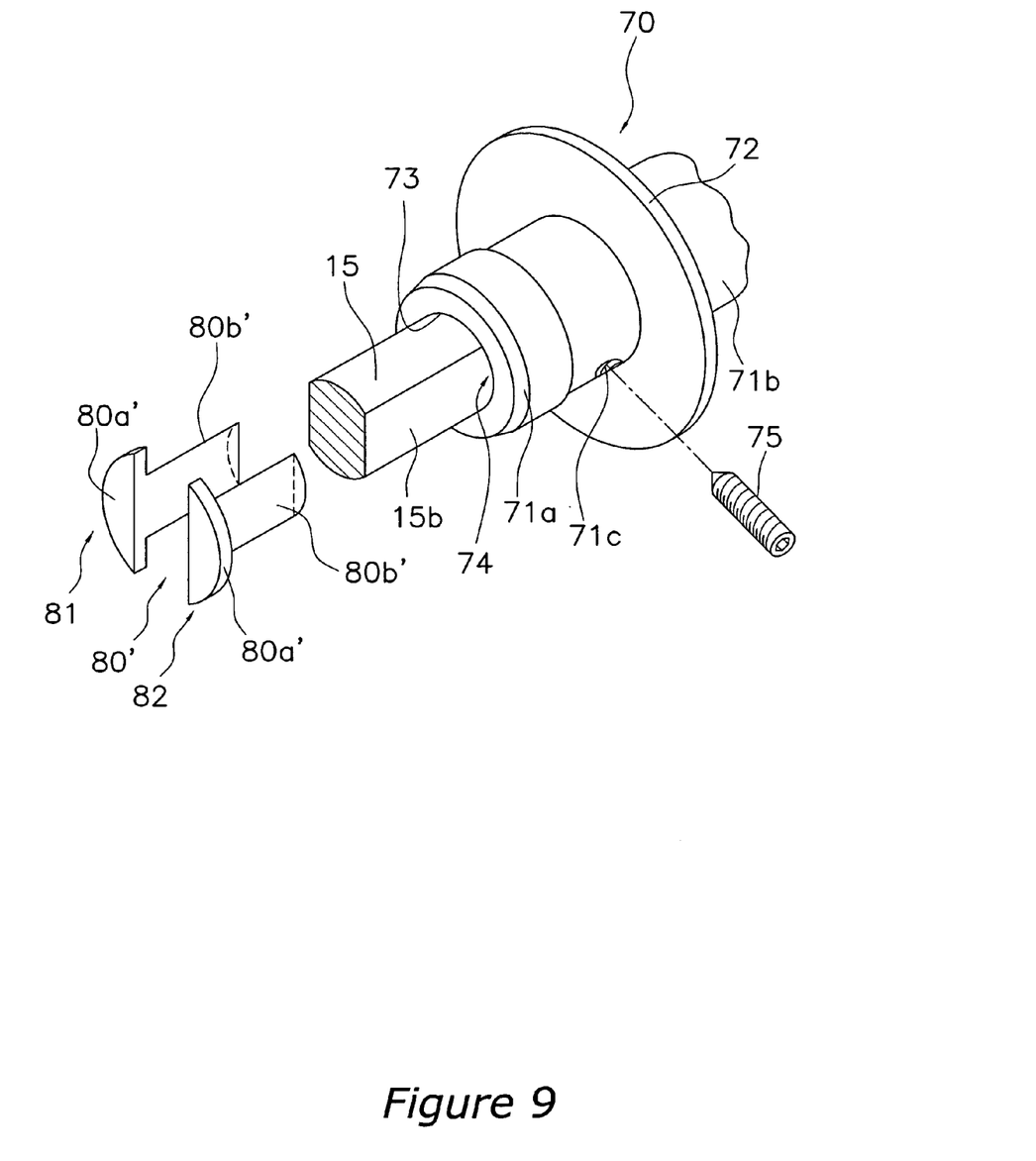
FIG. 9 is a view of partial perspective view of the support portion of the spool in accordance with another embodiment of the present invention.

Referring now to FIG. 9, a spool support structure in accordance with alternative embodiments will now be explained. In view of the similarity between the first and alternative embodiments, the parts of the alternative embodiments that are identical to the parts of the first embodiment will be given the same reference numerals as the parts of the first embodiment. Moreover, the descriptions of the parts of the alternative embodiments that are identical to the parts of the first embodiment may be omitted for the sake of brevity.

(a) A shallow-channel spool is used in the foregoing embodiment. However, the present invention is not limited thereby, and may be applied to spools for any type of spinning reel.

(b) Two bearings are employed in the foregoing embodiment, first bearing 56 and second bearing 57. However, the present invention is not limited thereby, and may for example have a structure in which only one bearing is employed.

(c) The retaining member 70 is fixedly coupled to the spool shaft 15 by the pin member 75 (such as an Allen screw) in the foregoing embodiment. However, the method by which the retaining member 70 is fixedly coupled to the spool shaft 15 is not limited thereto. Any conventional coupling means can be employed to couple the retaining member to the spool shaft.

(d) The spool receiving portion 20 is a metal ring member in the foregoing embodiment. However, the spool receiving portion 20 may further include a structure in which a corrugated portion is formed in the periphery of the spool receiving portion 20, and a sound generating mechanism that contacts the corrugated portion when the spool 4 is rotated.

(e) The foregoing embodiment employs one wobble prevention member 80 having two mounting portions 80b mounted in the gaps 74. However, as shown in FIG. 9, the wobble prevention member 80' can include a first wobble prevention member 81 and a second wobble prevention member 82 (examples of wobble prevention components) each having one mounting portion 80b' that is respectively mounted in the gaps 74. Note that the head portions 80a' of the first wobble prevention member 81 and the second wobble prevention member 82 are formed into approximate bow-shapes that are mirror images of each other, and come into contact with the front end of the retaining member 70 when the mounting portions 80b' are mounted in the gaps 74.

(f) In the foregoing embodiment, the mounting portions 80b' of the wobble prevention member 80 are fitted in all of the plurality of gaps 74. However, the wobble prevention member does not have to be fitted in all of the gaps created between the spool shaft and the retaining member.

According to the present invention, wobbling of the retaining member in the spool support structure of a spinning reel can be prevented because the gaps between the circular portion of the retaining member and the non-circular portion of the spool shaft can be reduced by mounting a wobble prevention member in the gaps.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-168743. The entire disclosure of Japanese Patent Application No. 2003-168743 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A spool support structure for a spinning reel that rotatably mounts a spool on a spool shaft, the spool shaft being arranged to move forward and backward with respect to a reel unit and including a non-circular portion formed in a non-circular shape on at least a front end side thereof, the spool support structure comprising:
   a bearing structure that is adapted to be disposed on an inner peripheral portion of the spool and which rotatably supports the spool;
   a spool receiving portion that is adapted to be mounted on a rear end of the non-circular portion of the spool shaft such that rearward movement of the spool receiving portion relative to the spool shaft is restricted;
   a retaining member that is adapted to be mounted to the spool shaft between the spool and the spool receiving portion, and includes a retaining portion on an outer peripheral side of which the bearing structure is disposed, and a pushing portion that is adapted to be pushed rearward by the spool, at least part of the retaining portion being mounted to the non circular portion of the spool shaft such that there is a gap between an inner periphery of the retaining portion and an outer periphery of the non-circular portion; and
   a wobble prevention member that is mounted in the gap between the inner periphery of the retaining portion and the outer periphery of the non-circular portion of the spool shaft.

2. The spool support structure set forth in claim 1, wherein the retaining portion includes a first retaining portion that is arranged on a front side of the pushing portion, and a second retaining portion that is arranged on a rear side of the pushing portion; and
   the bearing structure includes a first bearing that is disposed on the first retaining portion, and a second bearing that is disposed on the second retaining portion.

3. The spool support structure set forth in claim 1, wherein the retaining member is non rotatably mounted to the spool shaft with a pin member that is inserted through the retaining portion and the non-circular portion.

4. The spool support structure set forth in claim 1, wherein the outer periphery of the non-circular portion is formed into an approximate oval shape;
   the inner periphery of the retaining portion is formed into an approximate circular shape; and
   the gap between the inner periphery of the retaining portion and the outer periphery of the non-circular portion of the spool shaft is formed in an approximate bow shape.

5. The spool support structure set forth in claim 4, wherein the wobble prevention member includes a large diameter head portion that is disposed on a front side of the retaining member, and at least one mounting portion that is formed in an approximate bow shape and mounted in the gap.

6. The spool support structure set forth in claim 5, wherein the head portion is a plate shaped member whose outer shape is formed in an approximate bow shape.

7. The spool support structure set forth in claim 5, wherein the head portion is an annular member whose outer shape is formed in an approximate circular shape, and is formed unitarily with the mounting portion.

8. The spool support structure set forth in claim 5, wherein there are a plurality of gaps between the inner periphery of the retaining portion and the outer periphery of the non-circular portion, and
   the wobbling prevention member includes a plurality of mounting portions that are formed unitarily with the head portion and are mounted in the plurality of gaps.

9. The spool support structure set forth in claim 1, wherein the non-circular portion includes an engagement groove formed on its outer periphery; and the wobble prevention member includes an engagement projection that engages with the engagement groove such that the wobble prevention member is prevented from falling off of the spool shaft.

10. The spool support structure set forth in claim 1, wherein there are a plurality of gaps between the inner periphery of the retaining portion and the outer periphery of the non-circular portion of the spool shaft, and the wobble prevention member includes a plurality of wobble prevention components, each of the plurality of wobble prevention components including a large diameter head portion that is disposed on a front side of the retaining member and at least one mounting portion that is mounted in the gap.

11. A spinning reel, comprising:

a handle;

a reel unit rotatively supporting the handle and supporting a spool shaft such that the spool shaft moves forward and backward with respect to the reel unit, the spool shaft including a non-circular portion formed in a non-circular shape on at least a front end side thereof;

a rotor supported in front of the reel unit;

a spool mounted to the spool shaft in front of the rotor so as to be movable forward and backward with respect to the reel unit; and a spool support structure including a bearing structure that is disposed on an inner peripheral portion of the spool and which rotatably supports the spool;

a spool receiving portion that is mounted on a rear end of the non-circular portion of the spool shaft such that rearward movement of the spool receiving portion relative to the spool shaft is restricted;

a retaining member that is mounted to the spool shaft between the spool and the spool receiving portion, and includes a retaining portion on an outer peripheral side of which the bearing structure is disposed, and a pushing portion that is pushed rearward by the spool, at least part of the retaining portion being mounted to the non circular portion of the spool shaft such that there is a gap between an inner periphery of the retaining portion and an outer periphery of the non-circular portion; and a wobble prevention member that is mounted in the gap between the inner periphery of the retaining portion and the outer periphery of the non-circular portion of the spool shaft.

12. The spinning reel set forth in claim 11, wherein the retaining portion includes a first retaining portion that is arranged on a front side of the pushing portion, and a second retaining portion that is arranged on a rear side of the pushing portion; and the bearing structure includes a first bearing that is disposed on the first retaining portion, and a second bearing that is disposed on the second retaining portion.

13. The spinning reel set forth in claim 11, wherein the retaining member is non rotatably mounted to the spool shaft with a pin member that is inserted through the retaining portion and the non-circular portion.

14. The spinning reel set forth in claim 11, wherein the outer periphery of the non-circular portion is formed into an approximate oval shape;

the inner periphery of the retaining portion is formed into an approximate circular shape; and the gap between the inner periphery of the retaining portion and the outer periphery of the non-circular portion of the spool shaft is formed in an approximate bow shape.

15. The spinning reel set forth in claim 14, wherein the wobble prevention member includes a large diameter head portion that is disposed on a front side of the retaining member, and at least one mounting portion that is formed in an approximate bow shape and mounted in the gap.

16. The spinning reel set forth in claim 15, wherein the head portion is a plate shaped member whose outer shape is formed in an approximate bow shape.

17. The spinning reel set forth in claim 15, wherein the head portion is an annular member whose outer shape is formed in an approximate circular shape, and is formed unitarily with the mounting portion.

18. The spinning reel set forth in claim 15, wherein there are a plurality of gaps between the inner periphery of the retaining portion and the outer periphery of the non-circular portion, and the wobbling prevention member includes a plurality of mounting portions that are formed unitarily with the head portion and are mounted in the plurality of gaps.

19. The spinning reel set forth in claim 11, wherein the non-circular portion includes an engagement groove formed on its outer periphery; and the wobble prevention member includes an engagement projection that engages with the engagement groove such that the wobble prevention member is prevented from falling off of the spool shaft.

20. The spinning reel set forth in claim 11, wherein there are a plurality of gaps between the inner periphery of the retaining portion and the outer periphery of the non-circular portion of the spool shaft, and the wobble prevention member includes a plurality of wobble prevention components, each of the plurality of wobble prevention components including a large diameter head portion that is disposed on a front side of the retaining member and at least one mounting portion that is mounted in the gap.

* * * * *